United States Patent [19]

Walther et al.

[11] 3,878,404

[45] Apr. 15, 1975

[54] INTEGRATED CIRCUIT OF THE MOS VARIETY

[75] Inventors: Terry R. Walther, Sunnyvale; Michael R. McCoy, San Jose, both of Calif.

[73] Assignee: Electronic Arrays, Inc., Mountain View, Calif.

[22] Filed: Oct. 30, 1972

[21] Appl. No.: 302,199

[52] U.S. Cl. .................. 307/238; 340/173; 357/41

[51] Int. Cl. .................. H01l 11/14

[58] Field of Search .................. 317/234 W; 307/238

[56] References Cited

UNITED STATES PATENTS

| | | | |
|---|---|---|---|
| 3,582,909 | 6/1971 | Booher | 307/235 |
| 3,591,836 | 7/1971 | Booher et al. | 317/235 |
| 3,699,544 | 10/1972 | Joynson et al. | 307/238 |
| 3,705,390 | 12/1972 | Mundy | 307/238 |

*Primary Examiner*—Martin H. Edlow
*Attorney, Agent, or Firm*—Ralf H. Siegemund

[57] ABSTRACT

A MOSFET read/write random access memory is disclosed in which the individual bit cells perform individually, autonomously but concurrently refresh operation upon application of write pulses. Information can be changed in an addressed cell in a write cycle, and copies from the cell in a read cycle. The cells each are constructed from three MOSFET's, two nodes and a voltage gated or voltage dependent capacitor. The latter capacitor has just one main electrode and a gate of MOSFET-like configuration. The principle circuit involving that capacitor has the gate of a regulative MOSFET connected to the capacitor gate, both gates are or pertain to a node. A signal on the main electrode is transmitted by the capacitor only when the node is charged and only then is the regular MOSFET rendered conductive. The two other transistors and the additional node in a cell serves as charge transfer and addressing elements.

4 Claims, 6 Drawing Figures

INTEGRATED CIRCUIT OF THE MOS VARIETY

BACKGROUND OF THE INVENTION

The present invention relates to MOS-type channel effect structure and here particularly, but not exclusively, to an internal storage facilities for digital data bits to be used, for example, in integrated circuit type memories. The invention relates particularly to integrated circuit structure of the MOS variety to be used for storing, utilizing and restoring the charges on internal nodes.

Memories or other data bit storage facilities using MOSFET's (field effect transistors in the metal-oxide-semiconductor configuration) operate in that signals are stored in form of charges on so-called nodes, which can be kept isolated in a semiconductor element. Storing of a data bit in such a manner requires periodical refreshing of the charge, because the charge leaks off as the available leakage path length is usually quite small. Read/write memories constructed from such cells, therefore, require that its stored content be refreshed. This refresh operation is usually carried out by reading the content of the cells which store a multi-bit data "word," into a register, and writing that data word back into the cells.

Unfortunately, these refreshing or restoring operations have to be carried out relatively frequently, and whenever the memory operates for restoring its own data, it is not available otherwise. Therefore, this dynamically maintaining the data content slows down the memory operation and extends average access and cycle times. Another aspect of prior art memory cells is the fact that read out is accompanied by inversion and a charge in an addressed cell is sometimes discharged (though restored later). These operations extend access and cycle times even further.

DESCRIPTION OF THE INVENTION

It is an object of the present invention to provide a new integrated circuit structure for the selective control of a MOSFET in dependence upon the charge on a node. It is another object of the present invention to provide a storage cell which does not require refresher operation that interrupts the operation of the system of which the cell is a part. In particular, the refresher operation should be made as part of read/write cycles.

In accordance with the preferred embodiment of the invention, it is suggested to provide MOS active elements which includes two FET's and a novel, voltage gated capacitor. The gate electrode of the capacitor connects to a node which in turn is connected to the gate of one MOSFET element. The node is separately charged through a second MOSFET element. The first MOSFET element is rendered conductive through a signal applied to the other electrode of the voltage gated capacitor, but only when the node is charged to increase the effective capacitance of the voltage gated capacitor. The voltage gated capacitor has one electrode provided as is usual for providing source or drain electrode of a MOSFET. The other electrode is provided as an insulated gate on a thinned oxide region adjacent to the first electrode. The voltage gated capacitor is asymmetrical in structure; the voltage dependency of its capacitance directly results from the voltage across the electrodes, modified by secondary effects dependent upon the voltage on the gate relative to the substrate. The gate voltage, when above the inversion threshold underneath the thinned oxide layer, causes the capacitance to be larger in that the gate-to-substrate capacitance is coupled serially to the other electrode; when the gate voltage is below the threshold the capacitance is low, because the gate-to-substrate capacitance is decoupled from the other electrode. The substrate can receive a bias voltage, which will modify the effective threshold of the gated capacitor. As a consequence, the one MOSFET whose gate is connected to the node to which is also connected the gate-like electrode of the voltage gated capacitor, will be controlled to conduction by a signal applied to the other electrode of this capacitor, but only if the node is charged, as only then is the capacitance of the capacitor effective to transmit that signal.

In accordance with a further development of the invention, a memory cell is established by two nodes interconnected by a MOSFET element that has its gate controlled for conduction by a write cycle signal. The one node is additionally connected to a source of voltage supply by a second MOSFET element whose gate is controlled by the charge on the second node. The first node is connectible to signal input/output means through cell addressing circuitry; otherwise, the cell is isolated from that signal means. The second node is now additionally connected to one electrode of the novel, voltage gated capacitor which has its other electrodes connected to receive a read cycle signal.

The gate electrode of this novel, voltage gated capacitance connects to the second node of the memory cell. If the charge on that second node establishes a voltage below the inversion threshold voltage in the semiconductor region underneath the thinned oxide of the gated capacitance, the capacitance is low accordingly, and a signal on the first electrode has little effect on the effective voltage of the second node of the cell. If the latter node is charged to above the inversion threshold, the capacitance is quite large. A read control signal on the first electrode of the voltage gated capacitance is capacitively transmitted to the gate electrode thereof and from there to the second node of the cell and raises the voltage thereof, so that the MOSFET element controlled by the voltage of the node saturates to conduction. That process is used to charge the first node from an external voltage source, but only when the second node is charged. The charging of the first node is then used as cell output and/or for restoration of the charge in the second node.

Each read cycle signal as applied to a cell causes the first node therein to be charged when the second one is charged. That operation can be used for memory cell read out, or as preparation for a cell content refreshing operation, or both. A write operation causes charge state distribution from the first node to the second node. If the write cycle finds the cell addressed, the charge state of the first node is subject to additional control from the input/output signal means. If the write cycle occurs when the cell is not addressed, the write cycle just runs a write-restore operation. Thus, the refresh operation in itself finds the cell isolated from the signal means, and the charge content, if any, is restored just through internal operations in the cell and in response to sequential read/write cycle signals. The read signal is effective through the novel, gated capacitor having capacitance in dependence upon the charge state of the one node and that, in turn, determines whether the read cycle signal is effective to cause the other node to be charged from the external supply or not.

It is significant, that the cell write-in including the restore-refresh operation does not operate on an inverting basis. It is also significant that the cell as such does not require any direct connection to ground, only the signal means provide external application of ground and then, of course, only when the cell is addressed. The novel, voltage gated capacitor can be understood as a MOSFET element in which one of the two main electrodes is not used, i.e. left isolated (not even grounded!) or is entirely omitted. In no case will current flow through the inversion layer.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, FIG. 1 illustrates a substrate 10 of a p-conductive silicon material, as used for MOS integrated circuits. The substrate is covered with an oxide layer, usually silicon dioxide 11, which has been thinned in specified locations for the development of active FET elements. Presently, reference numeral 12 denotes likewise such a thinned region for the development of the particular novel element. Layer portion 12 is about 1,000 A thick.

Figure 1:
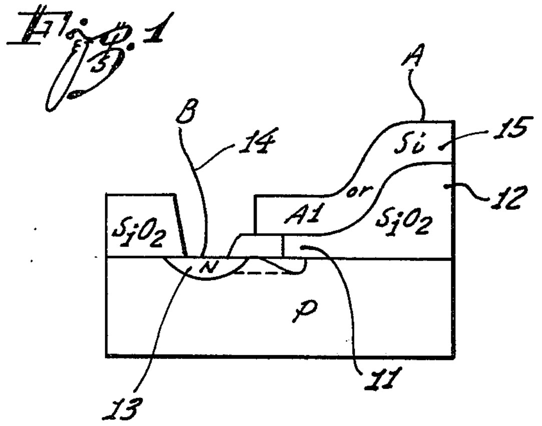
FIG. 1 is a somewhat schematic cross-section through the novel, voltage gated capacitor.

The element includes a single zone 13 of N-conductivity, developed analogously to the development of such zones for establishing the source and drain electrodes of a MOSFET. The zone 13 is, at least in parts, not covered by oxide, but is exposed for ohmic contact making with an electrode 14. An electrode plating 15 of the type used for and as a gate in MOSFET's extends above the thinned region 12 of the oxide layer 11. Plating 15 establishes electrode A, electrode 14 and zone 13 establish node B of the novel device.

Figure 1A:
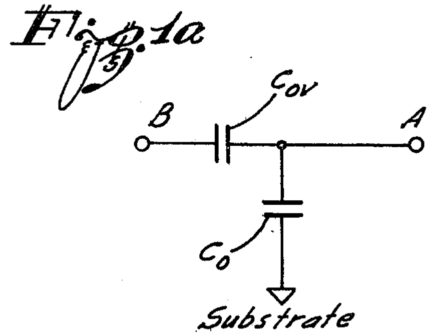
FIGS. 1*a* and 1*b* are equivalent circuits for that capacitor.

FIG. 1*a* illustrates the effective equivalent circuit of the element shown in FIG. 1 when the voltage of the gate electrode A is below the threshold voltage. Under these conditions, an inversion layer is not developed underneath silicon oxide layer portion 12. The effective capacitance Cov between electrodes A and B is quite small. The equivalent capacitance CO between the gate plating 15 adjacent layer 12 and the substrate underneath is not "seen" by the electrode B. The capacitance CO is significantly larger than capacitance Cov (about 25 times or thereabouts.

Figure 1B:
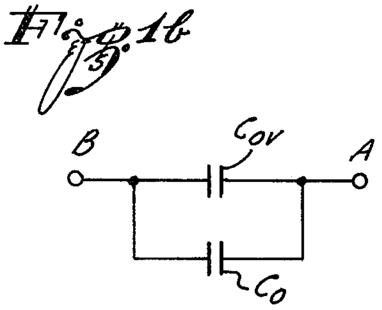

When the voltage on electrode A is above the threshold voltage (about 1.5 volts) an inversion layer 16 is formed which is electrically connected to zone 13 and, therefore, becomes part of the effective electrode B. This inversion layer causes a significant increase in the capacitance between electrodes A and B, as the substrate "electrode" of capacitor CO is now effectively connected to and is part of electrode B (FIG. 1*b*). Thus, capacitances Cov and CO are connected in parallel, and a greatly increased capacitance is now effective between electrodes A and B.

Figure 1C:
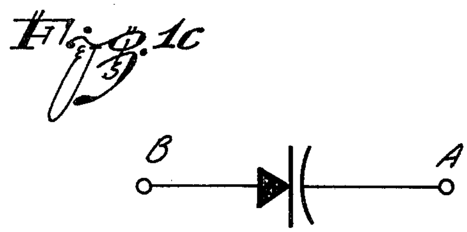
FIG. 1*c* is a suggested symbol for that capacitor in circuit diagram.

FIG. 1*c* represents a suggested symbol for such an element to be used in circuit diagrams. It can be seen that the important feature of this element is its voltage dependent capacitance, but that voltage dependency has a uni-directional feature. The voltage on electrode B may vary relative to substrate (e.g. ground), and little effect is produced on the effective capacitance. On the other hand, the gate electrode voltage relative to mode B determines the effective capacitance. Therefore, it is the potential difference between electrodes A and B which decides whether a voltage signal applied to electrode B is or is not transmitted to electrode A. The main electrode B provides the input for this element and electrode A provides gating and output if gating permits. How this aspect can be used effectively will be described next with reference to FIG. 2.

Figure 2:
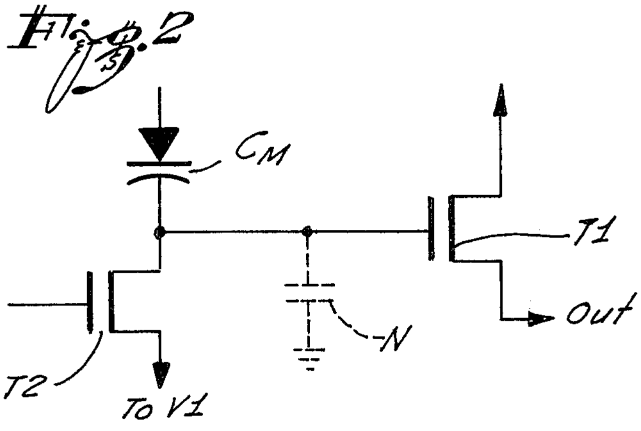
FIG. 2 shows a diagram for a novel control circuit for the control of a MOSFET in dependence upon the charge state of a node.

The FIG. 2 depicts a novel, voltage dependent capacitor CM of the type described above. One electrode (corresponding to electrode B above) is connected to receive a control signal of, say, fifteen volts. The other electrode (corresponding to electrode A above) connects to a node N. That node may either be charged or discharged. When charged, it has about 5 volts, when discharged, it may hold ground potential.

Node N connects to the gate electrode of a regular MOSFET T1 having its drain electrode connected to a biasing source VDD, while the source electrode connects to the terminal OUT. When the node N is charged, element CM has large capacitance (situation of FIG. 1b). As a control voltage of, say 15 volts, is applied to the input side of capacitor CM, that voltage is transmitted via the large capacitance so that the node voltage temporarily jumps, to about 20 volts, and the full voltage VDD is applied by transistor T1 to the OUT terminal; the internal threshold of transistor T1 is overcome by the boosted control as provided. In case node N is not charged, the control voltage will not be transmitted because the effective capacitance of CM is too low. Therefore, transistor T1 remains nonconductive.

The transistor T2 is independently controlled and connected, as far as its main electrodes is concerned, between node N and VDD (possibly through other transistors) to obtain selective charge or discharge of node N. This basic unit as comprised of the three elements, T1, T2 and CM, permits numerous applications. One of which will be described next.

Figure 3:
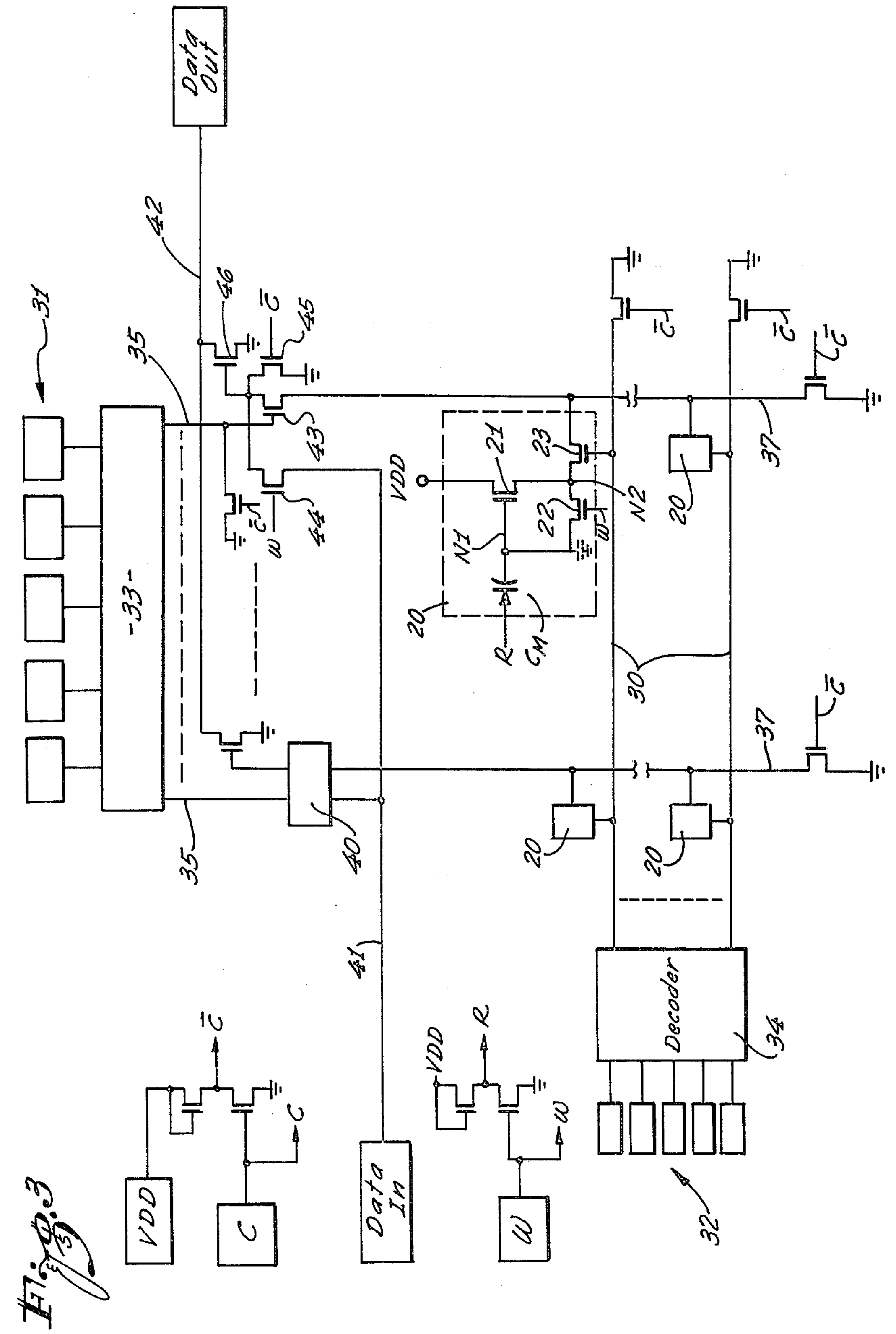
FIG. 3 is a circuit diagram for a memory cell with immediately associated structure.

Turning now to FIG. 3, there is illustrated schematically the layout of a memory chip using memory cells which incorporate the invention. Memory cells 20 are arranged in an array corresponding to an x-y addressing matrix. The cells are individually addressable, and the chip shown has as many cells as there are different addresses. By way of example, the chip may have $2^{10}$ cells arranged in a $2^5$ by $2^5$ array, there being $2^5$ x-addresses and $2^5$ y-addresses accordingly.

The chip has five input terminals 31 for five bits of an x-address and five input terminals 32 for the five bits of a y-address. Additionally, the chip has a terminal DATA IN and a terminal DATA OUT, respectively, for receiving one bit to be set into one of the 1024 cells and for presenting a bit that has been read from one cell. The chip has additional terminals for receiving a write control signal W that will accompany a bit on DATA IN. The chip will receive a clock signal c, biasing potential VDD as well as ground and body bias. Internally, a read signal R is generated as the complement to W. Thus, the chip either writes or reads when so commanded externally. When an address applied to the terminals 31 and 32 is not accompanied by a write signal W, the chip reads the addressed cell and presents its content at DATA OUT. Moreover, all cells have their content refreshed as will be described.

The five x-addressing bits when applied to terminal 31 are decoded in a decoder network 33 as conventionally used for MOS-memories, and one out of $2^5$ output lines 35 will receive an enabling signal. The five y-addressing bits when applied to terminal 32 are decoded in a similar decoder 34, and one out of $2^5$ output lines 36 will receive an enabling signal.

A plurality of altogether $2^5$ x-row steering logic and buffer control circuits 40 are provided, each being connected to one output line 35 for receiving the respective enabling x-decoder signal therein. The memory includes $2^5$ input/output lines 37 leading also to the steering circuits 40, one line per steering circuit. All steering circuits receive the DATA IN bit (line 41 in parallel); all steering circuits can apply a read-out bit, when receiving one, to the DATA-OUT terminal via an out bus or line 42.

The memory cells sit respectively at the intersections of a line 36 from y-decoder 34 and of an input/output line 37. Each of these lines 35, 36 and 37 will be discharged by the inverted clock $\overline{c}$, i.e. in between clock pulses C. The same is true for the steering circuits 40 as far as internal nodes is concerned; however, the cells 20 are not discharged in response to $\overline{c}$.

One of the circuits 40 is depicted in greater detail. It includes a MOSFET 43 whose gate connects to the associated output line of lines 34 as establishing from x-decoder 32. The drain electrode of MOSFET 43 connects to one of the lines 37 along which are arranged $2^5$ memory cells which have the same x-address. The source electrode of transistor 43 connects to a MOSFET 44 whose gate is controlled by the write signal W and whose drain electrode connects to receive the DATA IN bit. As the common junction of transistors 43 and 44 connects to and is part of a node, a transistor 45 regularly discharges that node on $\overline{c}$ as stated. An output control transistor 46 connects the steering circuit to bus 42. The transistor 46 gains control over the bus 42, when the respective steering circuit is x-addressed.

The steering circuits operate as follows. When a data bit is applied to DATA IN, a write signal W must also be present. All transistors 44 are conductive, but the transistor 43 of only one steering circuit is conductive by the enabling signal in one of the lines 35. Accordingly, the respective one of the lines 27 receives the particular bit, and the line 37 is either high or low depending on the bit value and the chosen association between signal levels and bit values. The bit will then be set into one of the $2^5$ cells on that line, depending on the concurrently effective y-address.

For reading, the transistors 44 of all steering circuits are blocked so that any DATA IN signal is disregarded and rejected. The y-address causes actually $2^5$ bits to be presented, one each in lines 37. However, the transistor 43 of only one steering circuit is conductive by operation of the concurrently decoded x-address, so that only one bit is applied to the data out bus 42 via the particular control transistor 46 of the one, x-addressed steering circuit.

After having described the overall memory layout, we turn to the description of a particular cell 20. It will be noted, however, that the overall layout does not include a usually needed refresher circuit for the memory cells. The memory may perform read or write operations without interpositioning of data refresher cycles; these are carried out within the cells and during regular read and write cycles.

The individual cell 20 is comprised of three MOSFET elements 21, 22 and 23, of which transistor 23 has its gate connected to one of the lines 36 to receive one of the decoded y-addresses when received by the y decoder 34. The cell includes two nodes, N1 and N2, whereby the node N1 is established between the one main electrode of transistor 22 and the gate of 21. The node N2 is established by the interconnection of one main electrode each of all transistors 21, 22 and 23. Transistor 23, when conductive, connects one of the input/output lines 37 to node N2 of the cell. The gate of the transistor 22 is controlled by the "write" signal W so that transistor 22 is conductive only during a memory write cycle, but always during that cycle, irrespective of addressing of that particular cell.

Character CM denotes the new voltage gated capacitor of the variety shown in FIG. 1 as it is used in the memory cell. The single main electrode of voltage gated capacitor CM (electrode B in FIG. 1) is connected to receive the "read" signal R. Therefore, it is the read signal that is to be transmitted or not through element CM. The gate electrode (A in FIG. 1) of element CM connects to and is part of node N1. Transistor 21 corresponds to T1 and transistor 22 corresponds to T2 in FIG. 2 because node N2 is input and output node for the cell. It should be noted, that the cell does not receive the clock, but biasing voltage VDD, for example, could be applied to the cell at clock rate, i.e. VDD could be a clock or clock gated.

During a write cycle, the operation of the cell as far as receiving a data bit is concerned is as follows. In order to participate in the write operation, it is, of course, necessary that the cell be addressed. Therefore, signals in one of the lines 36 is presumed to render a transistor 23 conductive. Also, it is presumed that the particular steering circuit 40 to which the particular line 37 connects has been addressed by an x-address so that a particular bit is applied from the data bus 41, via transistors 44 and 43 to the particular input/output line 37. Therefore, the bit on that one line 37 is now applied to node N2 of the cell under consideration.

As a write cycle is presumed, transistor 22 of the cell is likewise rendered conductive. Node N1 will be charged if the bit signal is a "high" voltage. The charge is usually derived from VDD through bus 41 (there may be a booster or inverter interposed between DATA IN and the steering circuits 40). Node N2 is likewise charged, but this in inconsequential. If the bit defining voltage on bus 41 is "low," node N1 remains discharged. A "low" bit causes no current to flow through transistors 44 and 43. The write signal W must be sustained for as long as the address and the data bit are applied to the chip. The clock must remain high so that $\overline{c}$ keeps the various discharge control transistors nonconductive.

Preceding any read cycle, all lines 37 are always discharged to ground, so are all nodes in the steering circuits 40. The two transistors 23 and 43, respectively, of one cell and one steering circuit are rendered conductive through the appropriate addressing signals when the content of the particular cell is to be read. These two transistors couple node N2 of the addressed cell to the OUT control FET 46. Concurrently, a read control signal R is applied to element CM. The particular operations now initiated depend on the content of the bit cell, i.e. whether or not node N1 is charged.

If node N1 is charged, the charge places the gate voltage on element CM continuously above substrate threshold; the effective capacitance of element CM is significantly increased accordingly. Thus, the read signal R will be transmitted through voltage gated capacitance CM, and not only is transistor 21 rendered conductive, but conduction is augmented directly by element CM, as that capacitor causes a large percentage of the read voltage signal to be added to the voltage resulting from the charge on node N1. Consequently, the gate of transistor 21 is driven to a voltage which is actually higher than VDD. Thus, VDD is coupled directly through transistors 21 to node N2 as the gate to source threshold of transistor 21 is overcome. Accordingly, the control transistor 46 is rendered conductive to saturation and applies ground to the DATA OUT terminal. It can thus be seen, that except for the final control of potential on DATA OUT, no inversion takes place, and the immediate cell read-out does not involve draining of a node.

If the node N1 of the addressed cell does not contain any charge or such a low charge that the voltage on the gate of voltage gated capacitor CM remains below substrate threshold, transistor 21 remains nonconductive. Accordingly, the particular input/output line 37 remains discharged and transistor 46 remains nonconductive. As illustrated, this failure of any transistor 46 to conduct causes bus 42 to assume floating potential. The actual potential will thus be determined by external bias as applied to the terminal of DATA OUT or as effective in the output circuit connected thereto.

All MOS dynamic memories store data as a charge on a capacitive node such as node N1. That charge must be periodically refreshed to prevent decay to zero because of associated diffusion leakage. However, unlike conventional MOS memories, refreshing operation of the memory presently described does not require separate operation cycles which effectively remove the memory from the system to which it pertains, just for purposes of memory content refreshing. Rather, it is required only that the memory does operate periodically in alternating read/write cycles generally. Each write and each read cycle, respectively, permits write in and read out of the addressed cells, while refreshing of all of the not addressed cells is carried out at the same time. Thus, refreshing requires merely that a train of write pulses be applied at all times so that internally read and write alternate. Generally, this is desired to begin with. It will also be shown that the refresh operation works properly even if the addressing changes from a read to the next write cycle.

The refresh operation depends on the existence of the node capacitor at N2, serving as source for the refresh current for a self refresh operation of and in the cell. Assuming that node N1 holds a charge, the read signal R is always capacitively coupled to the node N1 because voltage gated capacitor CM has large capacitance. Therefore, the transistors 21 of all cells holding node charges are rendered conductive, whether addressed or not. Accordingly, all cells storing a charge cause voltage VDD to be coupled to the respective node N2; all these nodes are charged. That charge is also applied to input/output lines 37 by the y-addressed cells which hold charges, but that is inconsequential as far as the refresh operation is concerned.

As the read signal R decays, the write signal W goes up, and all transistors 22 are rendered conductive. The charge on nodes N2 are respectively transferred to nodes N1 or more accurately, the nodes N1 share in the respective charges. Thus, in alternating read/write cycles, charges on node N1 and N2 are replenished, in that VDD is first applied to node N2, and part of the charge on node N2 flows to node N1 in the next write cycle. The node N1 of any cell that is not charged, prevents the respective transistor 21 from becoming conductive. Therefore, the nodes of the cell remain discharged.

This holds true regardless of whether or not a memory read operation takes place concurrently. Thus, the memory operates normally and regularly in the refresh mode, which is automatically established when a train of write pulses is applied. The refresh operation takes place regardless of any concurrent addressing and is independent from the clock signal C. A read operation is superimposed upon the refresh operation merely by addressing a cell, and the control of that cell is copied also into the DATA OUT bus and terminal. The copy operation does not disturb the concurring preparation for the refresh operation, also of that cell. Only a write operation disturbs, so to speak, the refresh operation for one cell by altering (possibly, but not necessarily) the charge content of node N2 and, therefore, also of node N1 by coupling the one input/output line 37 to the nodes of the addressed cell while that line itself is coupled to the DATA IN bus 41.

It should be mentioned also that $2^5$ cells are always y-addressed, but a write or read operation takes place only on one cell. The remaining $2^{10} - 1$ cells are refreshed only. The partial addressing does not disturb the refresh operation. If actual read or write operations take place concurrently with the refresh operation, they must be preceded by $\overline{C}$ being true, so that the input/output lines 37 leading to now addressed steering circuits 40 are discharged. Clock pulses are actually needed only during write and during read proper, when one of the lines 37 is occcupied by a bit that has been read or is to be written. At all other times, the clock could be low. This keeps all lines 30 and 37 at a discharge level and transistors 23 will be off, thus decoupling the cells from the addressing line system.

The refresh current can be calculated from the following relations. If the capacitance of CM is made larger than the combined capacitance of nodes N1 and N2, then the refresh current needed is equal to the number of read/write pulses per second multiplied by the difference between VDD and the desired voltage on node N1 multiplied by the capacitance of N2. The criteria for successful refresh is thus a read/write pulse rate that causes the refresh current to match that of the leakage current of the node being refreshed. The usual read/write sequences are considerably more frequent than needed as minimum cycle rate.

The invention is not limited to the embodiments described above but all changes and modifications thereof not constituting departures from the spirit and scope of the invention are intended to be included.

We claim:

1. In an integrated circuit of the variety, wherein the active elements include field effect transistors, which includes first signal means for providing read control signals and second signals means for receiving signals, and which also includes means providing a driving voltage, independently from the said read control signals, the combination comprising:

means for establishing first and second nodes;

a first field effect transistor having its main electrodes respectively connected to the first and second nodes, and having a gate for receiving a write-control signal;

a second field effect transistor having its main electrodes connected directly to the first node and to the means providing driving voltage to derive therefrom driving voltage independently from the read and write control signals, the second transistor having its gate connected to as being part of the second node;

a voltage gated capacitor structurally integral with said transistor and having its gate connected to the second node and its single main electrode connected to the first signal means to receive therefrom a read control signal; and field effect means connected to be responsive to addressing signals for transferring signals between the second node and the second signal means outside of the combination.

2. In a circuit as in claim 1, including means for providing alternating read and write control signals for periodically restoring a charge of the second node, independently from addressing signals in the field effect means.

3. In a circuit as in claim 2, the MOS field effect means including a third field effect transistor, the signal means including an input/output line, the third field effect transistor connected between the first node and the input/output line, the signal means including means to set a bit into the input/output line concurrently with a write signal on the gate of the first MOS-FET, and means to copy a bit from the input/output line concurrently with a read signal.

4. An improved three transistor memory cell responsive to alternating and separately provided read and write signals comprising:

first and second pairs of access lines, wherein the first pair of access line includes one line receiving permanently bias potential, and one of the second pair of lines receiving an addressing signal independently from the read and write signals, the other one of the second pair of lines receiving the write signals only;

first and second field effect transistors having their source-drain paths series connected between the line receiving bias potential and the other one of said first pair of access lines and having a common junction developed as a first node; the gate of said first transistor forming a second storage node for storing information in the form of electric charge; the gate of said second transistor coupled to the one of said second pair of access lines and controlled by the addressing signals thereon;

a third field effect transistor, having its gate coupled to the other of said second pair of access lines and controlled by the write signals thereon and having its drain-source connected between the first and second node for coupling signals on said first node to said second storage node; and a voltage variable capacitor, comprising a gate electrode and a drain electrode, connected for receiving and coupling the read signals to said storage node only in dependance upon the charge content of said storage node as biasing the capacitor.

* * * * *